(12) United States Patent  (10) Patent No.: US 9,367,933 B2
Joshi  (45) Date of Patent: Jun. 14, 2016

(54) LAYERING A LINE WITH MULTIPLE LAYERS FOR RENDERING A SOFT BRUSHSTROKE

(75) Inventor: Pushkar Prakash Joshi, Fremont, CA (US)

(73) Assignee: Google Technologies Holdings LLC, Mountain View, CA (US)

(*) Notice: Subject to any disclaimer, the term of this patent is extended or adjusted under 35 U.S.C. 154(b) by 825 days.

(21) Appl. No.: 13/533,193

(22) Filed: Jun. 26, 2012

(65) Prior Publication Data

US 2013/0342560 A1 Dec. 26, 2013

(51) Int. Cl.
*G06T 11/20* (2006.01)
*G06T 11/00* (2006.01)

(52) U.S. Cl.
CPC ............. *G06T 11/001* (2013.01); *G06T 11/203* (2013.01)

(58) Field of Classification Search
None
See application file for complete search history.

(56) References Cited

U.S. PATENT DOCUMENTS

| | | |
|---|---|---|
| 5,430,834 A | 7/1995 | Takahashi et al. |
| 5,687,259 A | 11/1997 | Linford |
| 5,845,299 A | 12/1998 | Arora et al. |
| 5,977,981 A * | 11/1999 | Brown .......................... 345/581 |
| 6,084,598 A | 7/2000 | Chekerylla |
| 6,771,291 B1 | 8/2004 | DiStefano |
| 6,803,913 B1 * | 10/2004 | Fushiki et al. ................ 345/467 |
| 6,954,903 B2 | 10/2005 | Richard |
| 7,000,184 B2 | 2/2006 | Matveyenko et al. |
| 7,086,013 B2 | 8/2006 | Saund et al. |
| 7,133,050 B2 | 11/2006 | Schowtka |
| 7,287,227 B2 | 10/2007 | Ries et al. |
| 7,444,597 B2 | 10/2008 | Perantatos et al. |
| 7,461,346 B2 | 12/2008 | Fildebrandt |
| 7,543,267 B2 | 6/2009 | Lindhorst et al. |
| 7,764,286 B1 | 7/2010 | Kumar |
| 7,770,122 B1 | 8/2010 | Shaik |
| 7,779,359 B2 | 8/2010 | Francis et al. |
| 7,812,850 B1 | 10/2010 | Nelson |
| 7,884,834 B2 | 2/2011 | Mouilleseaux et al. |
| 8,120,620 B2 | 2/2012 | Yamauchi |
| 8,171,399 B2 | 5/2012 | Coppedge |
| 8,250,486 B2 | 8/2012 | Lentz |
| 8,255,814 B2 | 8/2012 | Arvin |
| 8,335,389 B2 | 12/2012 | Ishida |
| 8,381,093 B2 | 2/2013 | Mohan |
| 8,487,963 B1 * | 7/2013 | Harris et al. ................... 345/643 |

(Continued)

OTHER PUBLICATIONS

Adobe Labs, Adobe Edge Preview, "Motion and Interaction Design for HTML5", http://labs.adobe.com/technologies/edge/ as archived by The Wayback Machine on May 3, 2012 at 13:55:05, accessed via http://web.archive.org/web/20120503135505/http://labs.adobe.com/technologies/edge/ on Jan. 29, 2015, 2 pages.

(Continued)

*Primary Examiner* — Aaron M Richer
(74) *Attorney, Agent, or Firm* — Ropes & Gray LLP

(57) ABSTRACT

A method for drawing a line having a gradient opacity across a width of the line includes receiving a path for rendering the line in a user interface, and rendering, by a computing device, a plurality of composite lines on a user interface along the path to form the line. The composite lines of the plurality of composite lines have different widths have an opacity, and are multilayered along the path. The method further includes centering, by the computing device, longitudinal-centers of the plurality of composite lines with a center of the path. The opacity of the plurality of composite lines is additive across portions of the width of the line to form the gradient opacity.

25 Claims, 8 Drawing Sheets

(56) References Cited

U.S. PATENT DOCUMENTS

| | | | |
|---|---|---|---|
| 8,547,403 | B1 | 10/2013 | Stiglitz |
| 8,555,200 | B2 | 10/2013 | Hicks et al. |
| 2002/0093538 | A1 | 7/2002 | Carlin |
| 2003/0226111 | A1 | 12/2003 | Wirts et al. |
| 2004/0012617 | A1* | 1/2004 | Beaumont et al. ............ 345/690 |
| 2006/0005114 | A1 | 1/2006 | Williamson et al. |
| 2006/0041564 | A1 | 2/2006 | Jain et al. |
| 2006/0288312 | A1 | 12/2006 | Akiyama et al. |
| 2007/0174027 | A1 | 7/2007 | Moiseyev |
| 2008/0275964 | A1 | 11/2008 | McCollum et al. |
| 2009/0019370 | A1 | 1/2009 | Pally |
| 2010/0011309 | A1 | 1/2010 | Mitra |
| 2010/0083146 | A1 | 4/2010 | Hasuike et al. |
| 2010/0302245 | A1 | 12/2010 | Best |
| 2011/0015917 | A1 | 1/2011 | Wang |
| 2011/0250706 | A1 | 10/2011 | Huff |
| 2012/0133667 | A1 | 5/2012 | Lachoff |
| 2012/0246554 | A1 | 9/2012 | Shappir |
| 2012/0266061 | A1 | 10/2012 | Williamson et al. |
| 2012/0278701 | A1 | 11/2012 | Bockus et al. |
| 2012/0293558 | A1 | 11/2012 | Dilts |
| 2012/0324332 | A1 | 12/2012 | Zaragoza et al. |
| 2013/0120426 | A1* | 5/2013 | DiVerdi et al. ................ 345/589 |
| 2013/0179805 | A1 | 7/2013 | Wyser |

OTHER PUBLICATIONS

Bidelman, "Native HTML5 Drag and Drop", Sep. 30, 2010, 9 pages, http://www.html5rocks.com/en/tutorials/dnd/basics/.

Chapman, "Ultimate Guide to Website Wireframing", Nov. 1, 2010, 37 pages, http://sixrevisions.com/user-interface/website-wireframing/.

McGarry, "Kutout—An Application for Cutting Out Images", Mar. 30, 2010, 9 pages.

Mozilla Development Network, "Pixel Manipulation with Canvas", retrieved Apr. 18, 2012, 4 pages, https://developer.mozilla.org/En/HTML/Canyas/Pixel_manipulation_with_canvas.

Stack Overflow, Any Way to Clone HTML5 Canvas Element with its Content?, retrieved Apr. 18, 2012, 2 pages, http://stackoverflow.com/questions/3318565/any-way-to-clone-html5-canvas-element-with-its-content.

Stack Overflow, How to Drag and Drop from one HTML5 Canvas to Another, retrieved Apr. 18, 2012, 2 pages, http://stackoverflow.com/questions/4599801/how-to-drag-and-drop-from-one-html5-canvas-to-another.

Sucan, "Creating an HTML 5 Canvas Painting Application", Dev. Opera, Mar. 17, 2009, 10 pages, http://devopera.com/articles/view/html5-canvas-painting/.

Word 2007: Flowcharts, Information Technology Services, pp. Nov. 10, 2009, 11 pages, https://web.archive.org/web/20091110074856/http://ase.tufts.edu/its/trainDocuments/word07Flowcharts.pdf>.

Indeeo, "iDraw User Guide iDraw for Mac OS X" 2011, v2.02, 67 pages.

Adobe Systems, "Illustrator Help/ Help and Tutorials", May 16, 2012, 4 pages, http://tv.adobe.com/watch/learn-illustrator-cs5/creating-complex-art-with-the-shape-builder-tool-/#.

You Tube, "Digital Calligraphy—Playing with a 3D Letter e—40 fps", May 16, 2012, 2 pages, http://www.youtube.com/watch?v=FiGNI1TEzA4&feature=related.

Adobe, Adobe Dreamweaver CS6, 2012, http://www.adobe.com/products/dreamweaver.html, pp. 2.

"Microsoft® PowerPoint® 2010 Bible," Faithe Wempen, ISBN: 9780470591864, 2010, Wiley Publications inc., Chapter 1 : A first look at PowerPoint.

"Microsoft® PowerPoint® 2010 Bible," Faithe Wempen, ISBN: 9780470591864, 2010, Wiley Publications inc., Chapter 10 : Drawing and Formatting Objects.

Sencha, Sencha_Architect_2_2012, http://www.sencha.com, pp. 1.

* cited by examiner

LAYERING A LINE WITH MULTIPLE LAYERS FOR RENDERING A SOFT BRUSHSTROKE

BACKGROUND

Drawing applications operable on computing devices render images on displays of the computing devices. The drawing applications render basic shapes, such as lines, which form parts of more complicated images. Basic shapes rendered by the drawing applications should be rendered relatively quickly so that complicated images may also be rendered quickly.

Basic shapes, such as lines, often have properties that result in the lines being rendered relatively slowly. For example, lines may have a softness or gradients where generating the softness or gradients for the lines consumes a relatively large amount of processing power.

One simplified method for rendering lines is the use of stamps where a profile for a width of a line is determined for the stamp, and the stamp is stamped along a path in a user interface on the display for rendering lines. Line rendering methods using stamps often do not provide a desired softness, color gradient, etc. because the stamps have a width and rendered images of stamps on the user interface overlap one another. The overlapping of the stamps often renders lines harder than desired and having color gradient that is not consistent from end to end.

DETAILED DESCRIPTION

Described herein are techniques for rending lines by a drawing application where the lines have gradient opacities for a softened appearance.

According to one embodiment, a method for drawing a line having a gradient opacity across a width of the line includes receiving a path for rendering the line in a user interface, and rendering, by a computing device, a plurality of composite lines on a user interface along the path to form the line. The composite lines of the plurality of composite lines have different widths have an opacity and are multilayered along the path. The method further includes centering, by the computing device, longitudinal-centers of the plurality of composite lines with a center of the path. The opacity of the plurality of composite lines is additive across portions of the width of the line to form the gradient opacity.

According to another embodiment, a method for drawing a calligraphic line includes receiving a path for rendering the calligraphic line in a user interface, and determining, by a computing device, a number of composite lines to render for the calligraphic line to have the width. The method further includes rendering, by the computing device, the composite lines in a user interface in parallel along the path to form the calligraphic line.

According to one embodiment, a method for drawing a calligraphic line having a turning section along a longitude of the calligraphic line includes receiving a path for rendering the calligraphic line in a user interface. The method further includes rendering, by a computing device, a first plurality of composite lines on a user interface in parallel along the path to form a first side of the calligraphic line in the user interface, and rendering, by the computing device, a second plurality of composite lines on the user interface in parallel along the path to form a second side of the calligraphic line in the user interface. The first side of the calligraphic line and the second side of the calligraphic line are joined at the turning section. When the second side of the calligraphic line and the first side of the calligraphic line coincide at portions of the calligraphic line on the user interface, the second side of the calligraphic line replaces the first side of the calligraphic line at the portions.

Figure 1:
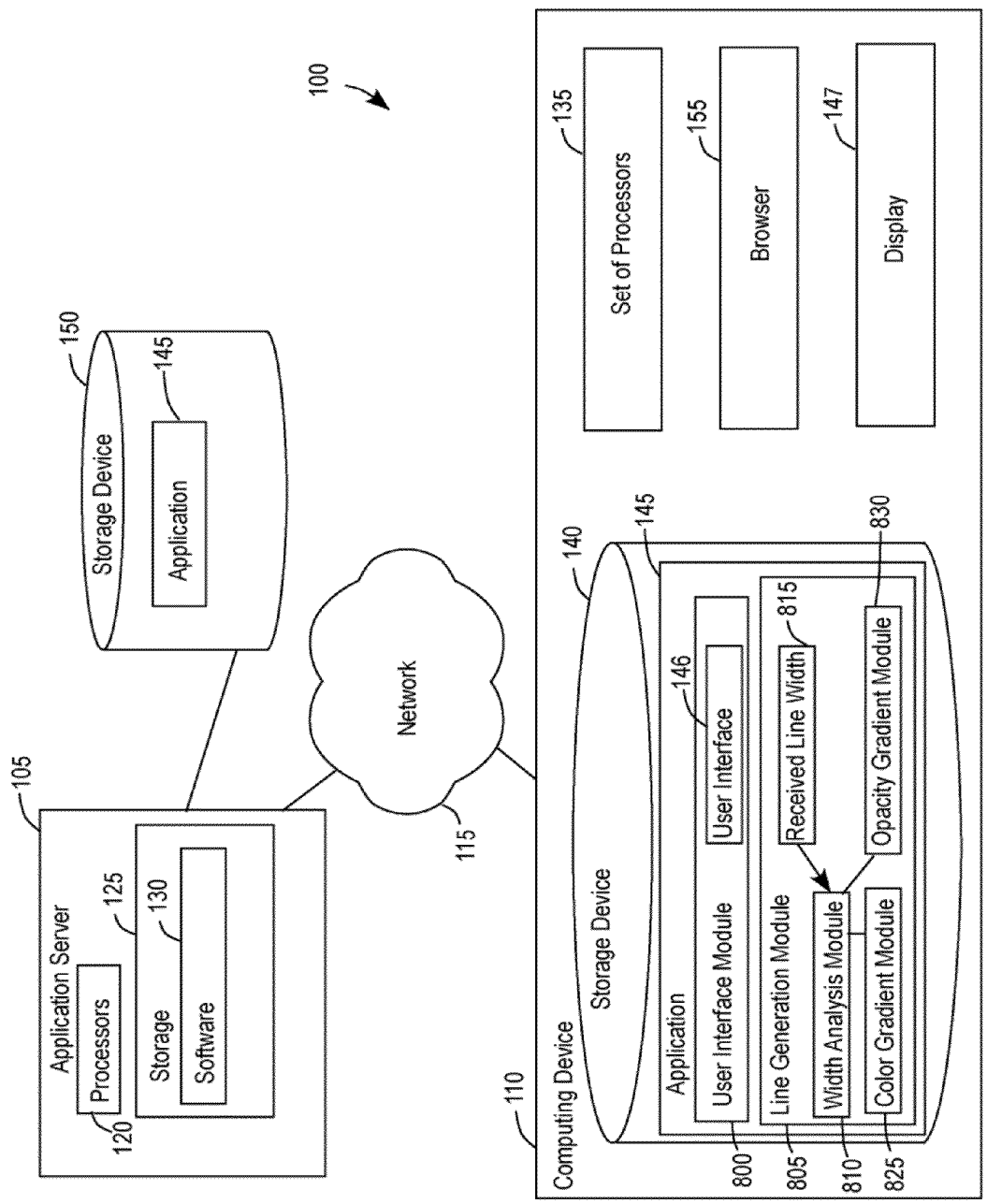
FIG. 1 depicts a computing system according to one embodiment.

FIG. 1 depicts a computing system 100 according to one embodiment. Computing system 100 includes an application server 105, a computing device 110, and a network 115. Application server 105 may be a computing device that operates a server operating system. Application server 105 may include a set of processors 120 and a storage device 125. Storage device 125 may store software 130, which may be supplied from storage device 125 to the set of processors 120 for execution. Computing device 110 may include a set of processors 135, a storage device 140, and a display 147. Storage device 140 may store copies of an application 145, which may be supplied from storage device 140 to processors 135 for execution. Storage device 140 may store other software, which may also be supplied to processors 135 for execution. Storage devices 125 and 140 may be non-transitory computer readable storage mediums. Computing device 110 may be one of a variety of devices, such as a desktop computer, a laptop computer, a tablet computer, a mobile device, such as a personal digital assistant (PDA) or a smartphone, etc. Network 115 may include a variety of networks, such as one or more intranets, the Internet, etc.

Application server 105 may access an application storage 150 (a non-transitory computer readable medium), which stores application 145 according to one embodiment. Application server 105 may provide a copy of application 145 to computing device 110. For example, application 145 may be a web application operable in a browser environment of a browser 155 or a standalone application that does not operate in the browser environment. While application 145 is described as being provided to computing device 110 from application server 105, computing device may load application 145 from a disk memory, or the like.

Application 145 is a drawing program configured for user interaction via computing device 110 according to one embodiment. Application 145 may render images, such as computer drawings, in a user interface 146 displayed on display 147. Application 145 may draw lines in user interface 146 were the lines have a gradient opacity across a width of the lines. The gradient opacity makes the lines have a soft appearance. Application 145 may also draw lines in user interface 146 where the lines are drawn from a number of composite lines. The composite lines may have a variety of characteristics, such as a color gradient, where a line formed from the composite lines has the color gradient. Application 145 may also draw lines on a user interface where the lines have a turning section along a length of the lines. Methods described herein for drawing lines in user interface 146 provide for relatively fast rendering of the lines as will be described in detail below.

Figure 2A:
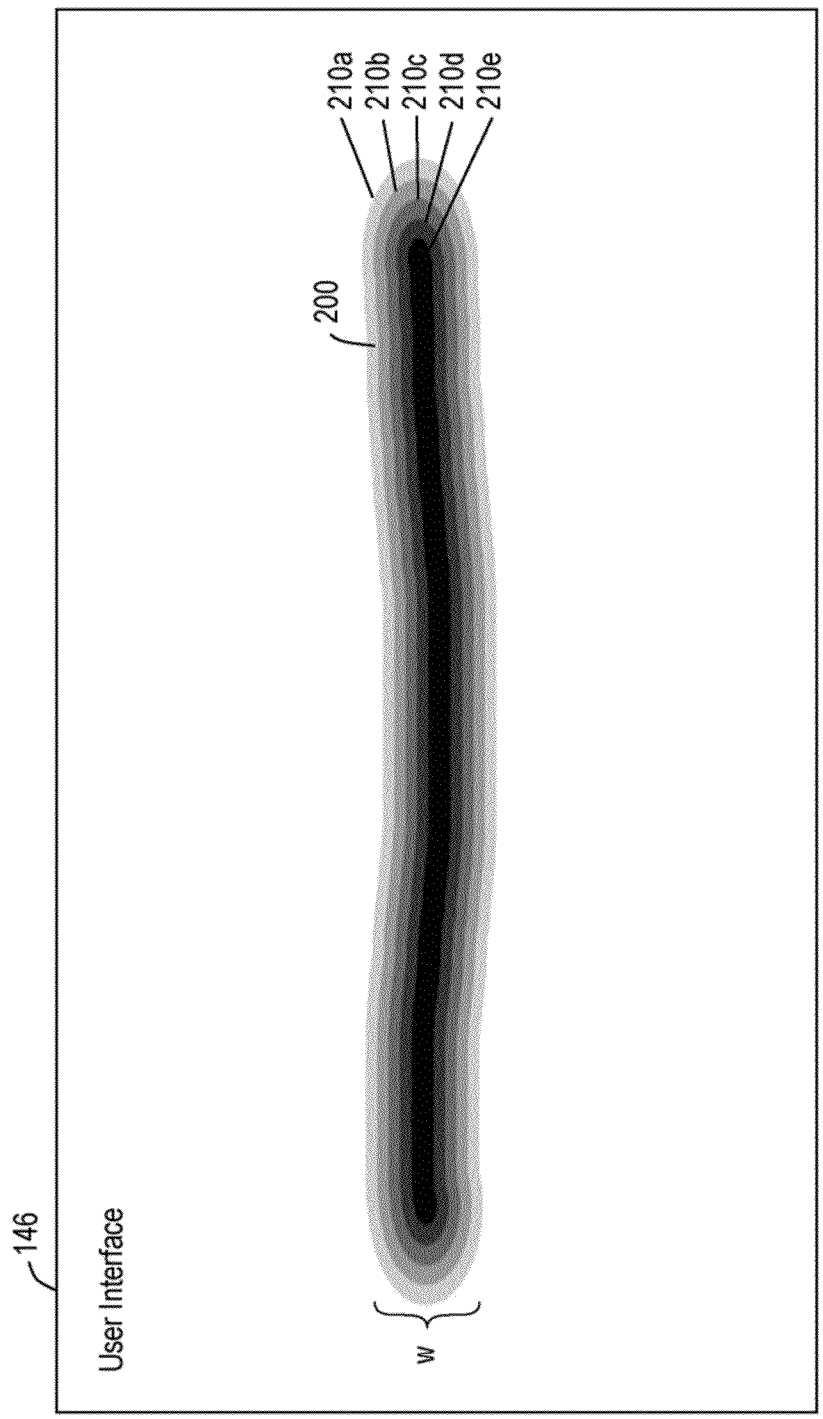
FIG. 2A depicts a line, which has a gradient opacity, rendered on a display of a computing device by an application operating on the computing device according to one embodiment.

FIG. 2A depicts a line 200 rendered in user interface 146 on display 147 by application 145 according to one embodiment. Line 200 has a gradient opacity across a width "w" such that line 200 has a soft appearance. The gradient opacity may decrease from the longitudinal center of line 200 to the sides of line 200. Line 200 includes a set of composite lines 210. Each composite line 210 has the same opacity according to one embodiment. Composite lines 210 may have different opacities according to another embodiment. The opacity of composite lines 200 is additive where composite lines 200 overlap (i.e., are multilayered) across the width and length of line 200 to form the gradient opacity (i.e., softness) as shown in FIG. 2. Composite lines 210 having different opacities are described in further detail below.

Figure 2B:
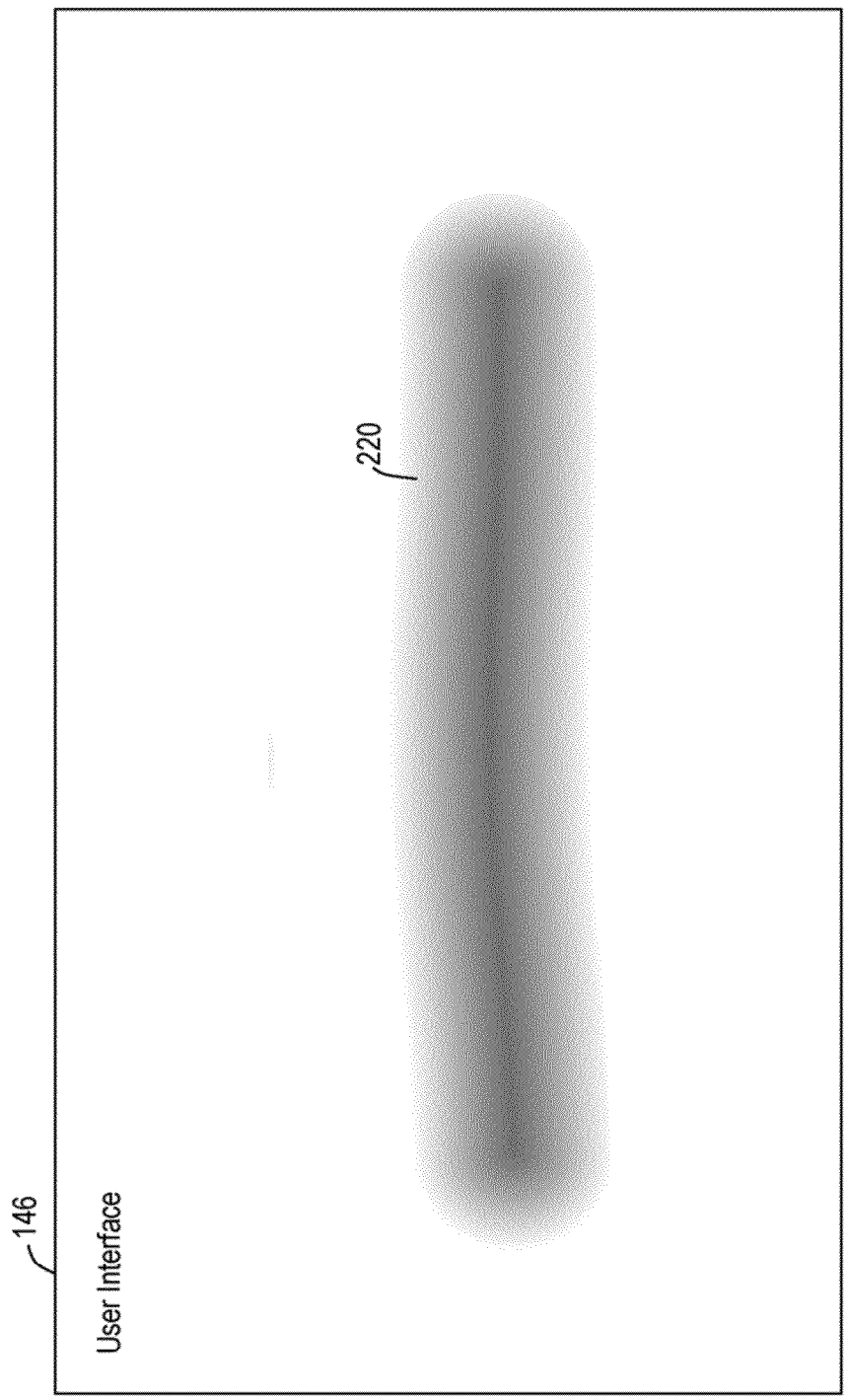
FIG. 2B depicts another line rendered on the display by the application where the line has a gradient opacity according to one embodiment.

FIG. 2B depicts a line 220 rendered on display 147 and having a gradient opacity that is lower than the gradient opacity of line 200 shown in FIG. 2A. Both of lines 200 and 220 may be rendered via the method described below with respect to FIG. 3.

Figure 3:
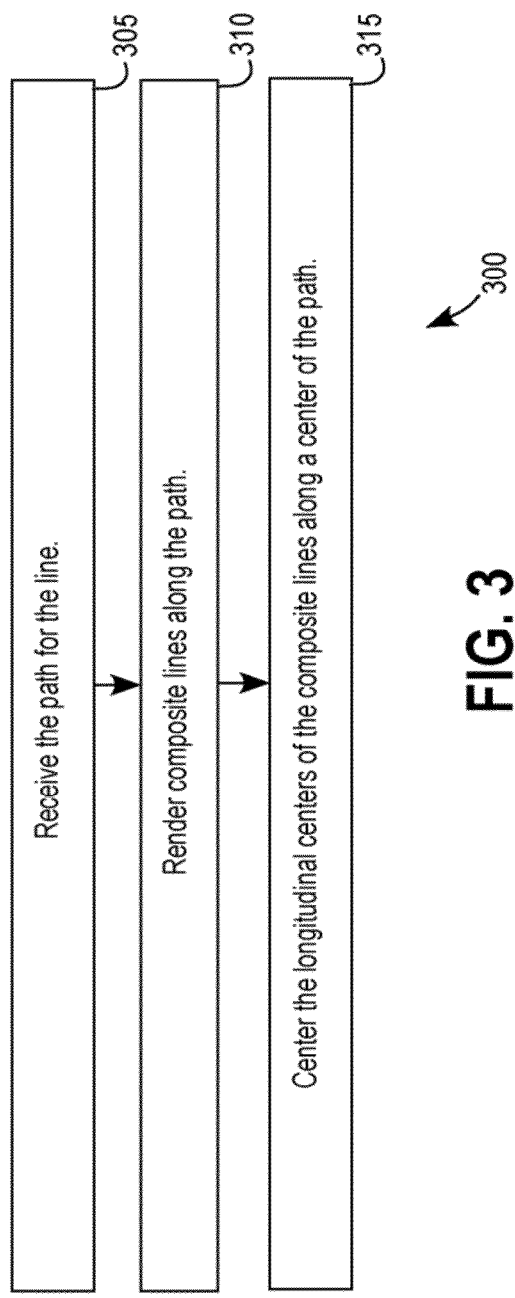
FIG. 3 depicts a high-level flow diagram of a method for rendering the line depicted in FIG. 2A according to one embodiment.

FIG. 3 depicts a high-level flow diagram of a method 300 for rendering line 200 (or line 220) in user interface 146 by application 145 operating on computing device 110. The high-level flow diagram represents an example embodiment and those of skill in the art will understand that various steps of high-level flow diagram 300 may be combined and/or added without deviating from the scope and the purview of the embodiment.

At 305, application 145 receives a path for rendering line 200 in user interface 146. The path may be created by dragging a pointer across user interface 146, or via coordinates entered in user interface 146.

At 310, application 145 renders composite lines 210 in user interface 146 along the path. The number of composite lines 210 rendered may be determined based on a width of line 200. For example, the number of composite lines 210 may be half the number of pixels of the width of line 200, such as when the number of pixels is even. For example, if line 200 is 100 pixels wide, the number of composite lines 200 may be 50. If the number of composite lines is half the number of pixels across the width of line 200, each composite line that is wider than a next narrower composite line is two pixels wider than the next narrower composite line. If longitudinal centers of all of composite lines 200 are centered (i.e., registered) along a center of the path, then each composite line that is wider than a next narrow composite line will extend by one pixel from both sides of the next narrower composite line. A pixel may be a pixel on display 147. Different displays 147 may have different width pixels as is well known.

The number of composite lines 210 rendered may be half the number of pixels of the width of line 200 plus one additional line if the number of pixels across the width of line 200 is odd. If the number of composite lines is half the number of pixels across the width of line 200 plus one additional composite line, each composite line that is wider than a next narrower composite line is two pixels wider than the next narrower composite line. If longitudinal centers of all of composite lines 210 are centered along a center of the path, then each composite line that is wider than a next narrow composite line will extend by one pixel from both sides of the next narrower composite line.

If the number of pixels across the width of line 200 is even, and the number of composite lines 210 is even, the composite line at the center of line 200 may be two pixels wide. If the number of pixels across the width of line 200 is odd, and the number of composite lines 210 is half the number of pixels across the width of line 200 plus one additional line, the composite line at the center of line 200 may be one pixel wide. In FIG. 2A, line 200 is shown as including five composite lines with a narrowest composite line 210e one pixel wide. Note that composite line 210a is shown as being two pixels wider then the next narrower composite line 210b, and extends by one pixel from both sides of composite line 210b. Similarly, composite line 210b is shown as being two pixels wider then the next narrower composite line 210c, and extends by one pixel from both sides of composite line 210b. Composite line 210c is shown as being two pixels wider then the next narrower composite line 210d, and extends by one pixel from both sides of composite line 210d. Composite line 210d is shown as being two pixels wider then the next narrower composite line 210e (one pixel wide), and extends by one pixel from both sides of composite line 210e. Rendering composite lines 210 as described above and a shown in FIG. 2A, provides that line 200 has a softened appearance.

According to one embodiment, composite lines 210 have the same opacities. According to an alternative embodiment, a center line (i.e., a first portion) of composite lines 210 has a first opacity, and the remainder (i.e., a second portion) of composite lines 210 has a second opacity. The first opacity may be full opacity and the second opacity is less than fully opaque to provide a gradient opacity (or softness) at the sides and ends of line 200. The width of the center line and the number of composite lines in the second portion of composite lines 210 may be based on a hardness (or alternatively a softness) of line 200. Hardness is a percentage of line 200 that is fully opaque along the longitudinal center of line 200 according to one embodiment. For example, if line 200 has a hardness of twenty percent, then twenty percent of the width of line 200 along the longitudinal center of line 200 is fully opaque, and eighty percent of line 200 has a gradient opacity. The width of the center line may be set to match the hardness of line 200. For example, if line 200 has a hardness of twenty percent, then the center line may have a width that is twenty percent of the width of line 200 along the longitudinal center of line 200. The remaining eighty percent of the width of line 200 is composed of the second portion of composite lines 200. More generally, the number of composite lines 210 in the second portion of composite lines 210 may be proportional to one minus the hardness (i.e., softness) of line 200. According to a specific embodiment, the number of composite lines 210 in the second portion of composite lines 210 may be the width of line 200 (e.g., in pixels) multiplied by the softness. A hardness value for line 200 may be received by application 145 from a user input via computing device 110. The user input may be received via user interface 146 of application 145.

At 315, the longitudinal-centers of the composite lines are centered along a center of the path (received at step 305) of line 200. Stated alternatively, the longitudinal-centers of the composite lines are registered with respect to one another and with respect to the center of the path of line 200.

According to one embodiment, subsequent to composite lines 210 being rendered in user interface 146, an input is received for changing the opacity of a least one of composite lines 210, and the at least one of composite lines 210 is changed in line 200 in user interface 146. Similarly, subsequent to composite lines 210 being rendered in user interface 146 an input may be received for changing the hardness of line 200, and the opacities of one or more composite lines 210 are changed in user interface 146 based on the hardness change. According to another embodiment, an input is received for manually changing the number of composite lines rendered in user interface 146 for line 200 to adjust the gradient opacity of line 200, and the number of composite lines 210 is changed in user interface 146 accordingly.

Figure 4:
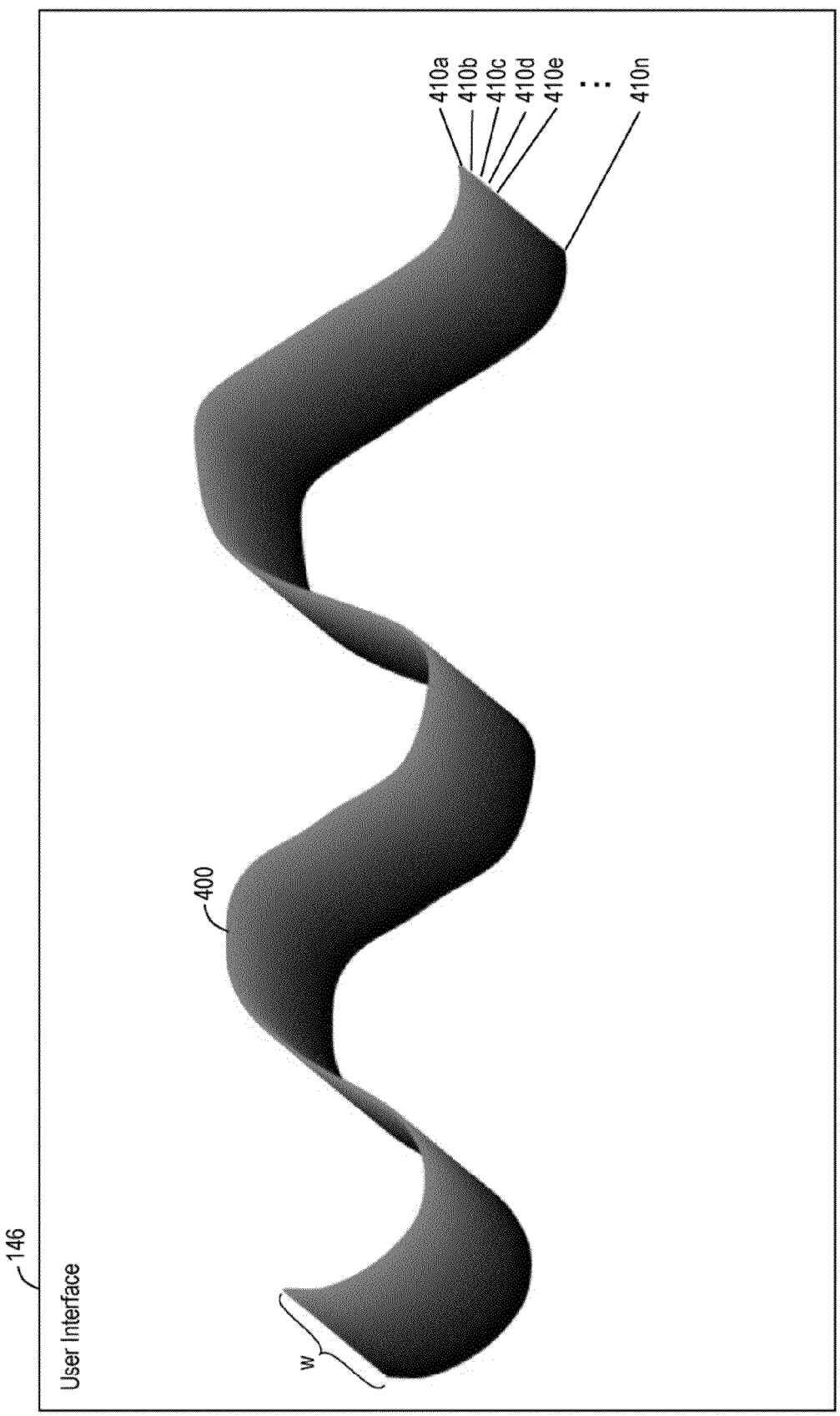
FIG. 4 depicts a calligraphic line rendered on the display according to another embodiment.

FIG. 4 depicts a calligraphic line 400 rendered in user interface 146 on display 147 by application 145 according to another embodiment. Calligraphic line 400 may be composed from a set of composite lines 410 rendered in user interface 146. Composite lines 410 may be rendered in parallel with respect to one another. Calligraphic line 400 has a gradient color across the width of calligraphic line 400. In the example of calligraphic line 400 shown in gray scale in FIG. 4, the color gradient is from black to gray. However, the color gradient may be between any two colors, such as black and red, yellow and orange, etc. While calligraphic line 400 is shown in FIG. 4 as having a single color gradient across the width of calligraphic line 400, calligraphic line 400 may have a number of color gradients across various widths.

Figure 5:
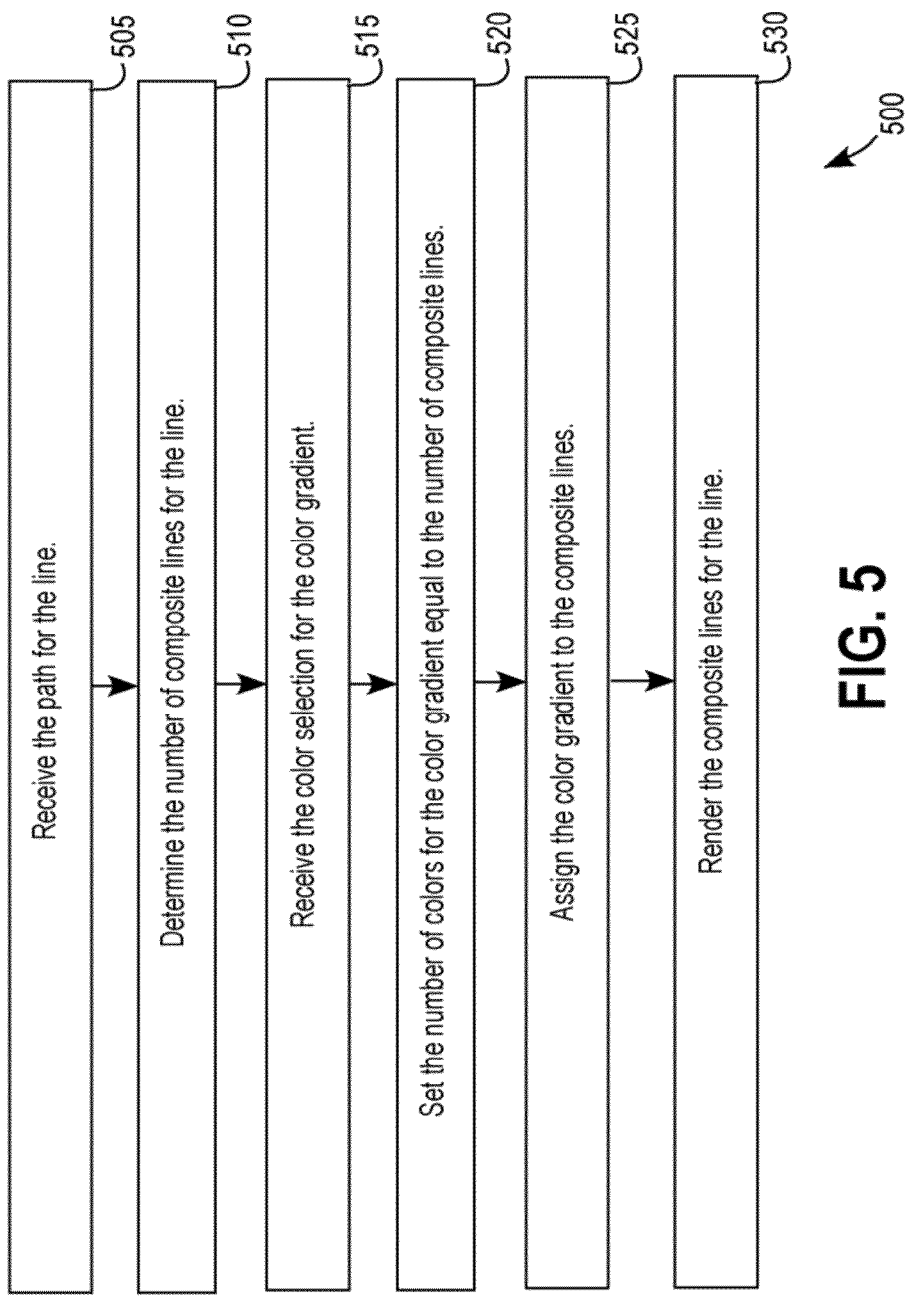
FIG. 5 depicts a high-level flow diagram of a method for rendering the calligraphic line shown in FIG. 4 on the user interface according to one embodiment.

FIG. 5 depicts a high-level flow diagram of a method 500 for rendering calligraphic line 400 in user interface 146 by application 145 operating on computing device 110. The high-level flow diagram represents an example embodiment and those of skill in the art will understand that various steps of high-level flow diagram 500 may be combined and/or added without deviating from the scope and the purview of the embodiment.

At 505, application 145 receives a path for rendering calligraphic line 400 in user interface 146 on display 127. The path may be created by dragging a pointer across user interface 146, or via coordinate entered in user interface 146.

At 510, application 145 determines a number of composite lines 410 for rendering calligraphic line 400 so that calligraphic line 400 has the width. The number of composite lines in the set of composite lines 410 may be the same as the number of pixels across the width of calligraphic line 400 or may be a percentage of the number of pixels across the width of calligraphic line 400.

At 515, application 145 receives a selection for a first color and a second color for the color gradient of the calligraphic line. The selection for the first color and the second color may be received by computing device 110 via user interface 146 of application 145. If calligraphic line 400 includes two or more color gradients, the colors (e.g., three or more colors) for the two or more color gradients may be received at 515.

At 520, a number of colors of the color gradient is set equal to the number of composite lines in the set of composite lines 410. The colors of the color gradient are a mix of the first color and the second color received at 515. If calligraphic line 400 includes two or more color gradients, the colors for the two or more color gradients may be assigned to different portions of composite lines 410.

At 525, the color gradient is assigned to composite lines 410 where the color gradient transitions from the first color to the second color across the width of the calligraphic line.

At 530, user interface 146 renders composite lines 410 in parallel along the path to form calligraphic line 400. One of composite lines 410 disposed along a first side of calligraphic line 400 may have the first color without having any of the second color mixed with the first color, and another of composite lines 410 along a second side of calligraphic line 400 may have the second color without any of the first color mixed with the second color so that the color gradient is relatively uniform across calligraphic line 400.

Figure 6:
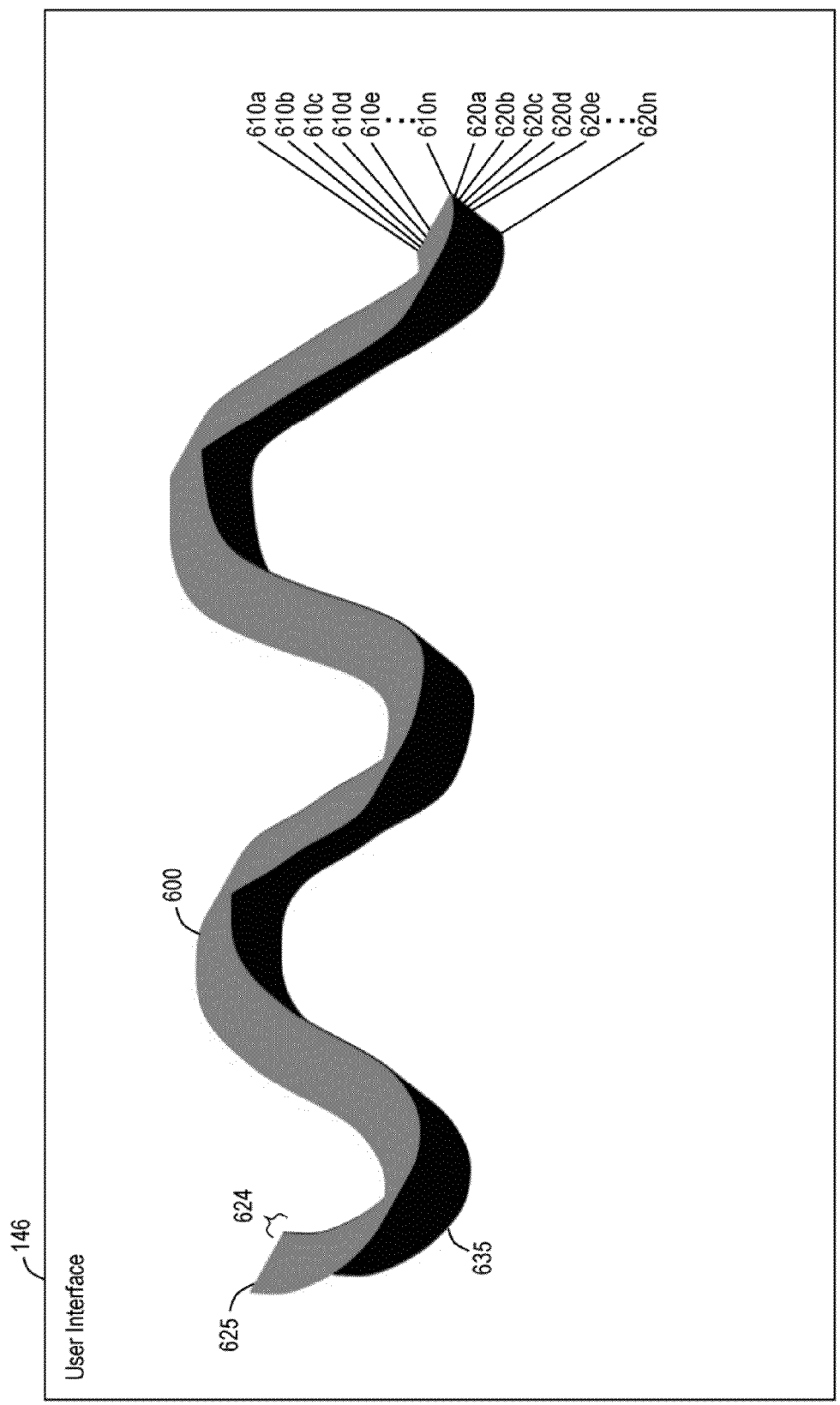
FIG. 6 depicts a calligraphic line rendered on the display where the calligraphic line has turning section along a longitudinal center of the calligraphic line according to one embodiment.

FIG. 6 depicts a calligraphic line 600 rendered in user interface 146 by application 145 according to another embodiment. Calligraphic line 600 may be composed from a first set of composite lines 610 and a second set of composite lines 620 rendered in user interface 146. Composite lines 610 and composite lines 620 meet at a turning section 624 of calligraphic line 600 according to one embodiment. Turning section 624 may extend along the longitudinal center of calligraphic line 600. Further, turning section 624 may be angled (as shown in FIG. 6) or may be rounded. Composite lines 610 and/or composite lines 620 may be one or more solid colors, may have one or more color gradients (described above), may have gradient opacities (described above), or may have a combination of one or more of the foregoing.

Figure 7:
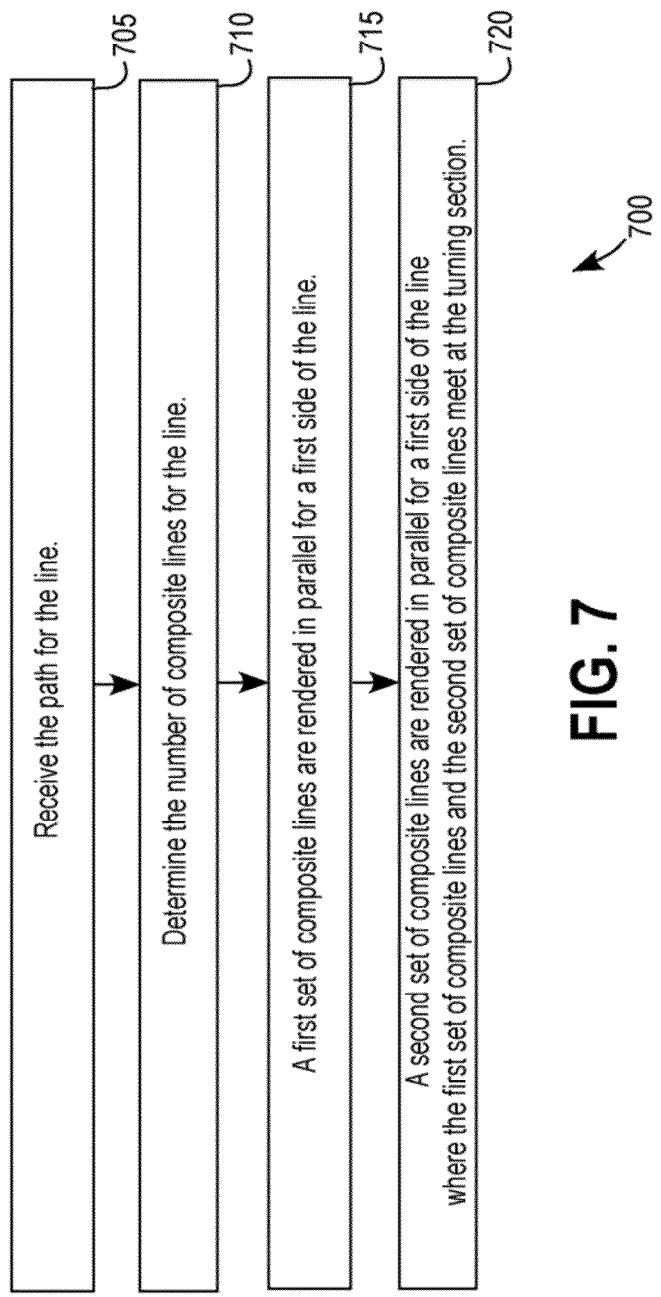
FIG. 7 depicts a high-level flow diagram of a method for rendering the calligraphic line shown in FIG. 6 on the user interface according to one embodiment.

FIG. 7 depicts a high-level flow diagram of a method 700 for rendering calligraphic line 600 in user interface 146 by application 145 operating on computing device 110. The high-level flow diagram represents an example embodiment and those of skill in the art will understand that various steps of high-level flow diagram 700 may be combined and/or added without deviating from the scope and the purview of the embodiment.

At 705, application 145 receives a path for rendering calligraphic line 600 in user interface 146.

At 705, application 145 renders composite lines 610 in parallel along the path to form a first side 630 of calligraphic line 600 in user interface 146.

At 715, application 145 renders composite lines 620 in parallel along the path to form a second side 635 of calligraphic line 600 in user interface 146. First side 630 and second side 635 of calligraphic line 600 meet at turning section 624 according to one embodiment. If second side 635 of calligraphic line 600 and first side 630 coincide (i.e., overlap) at portions of the calligraphic line, the second side of the calligraphic line replaces the first side of the calligraphic line at the portions.

According to one embodiment, the shape of turning section 624 may be user defined and/or may be selected from a number of shapes provided by application 145. Prior to rendering calligraphic line 600 the shape of turning section 624 may be received by application 145 from a user input to computing device 110. According to a further embodiment, the shape of turning section 624 may be changed after composite lines 610 and 620 are rendered in user interface 146 and the changed shape may be applied to calligraphic line 600 in user interface 146.

According to a further embodiment, calligraphic line 600 includes a number of turning sections 624, which have a number of shapes. Various sets of composite lines may be rendered in user interface 146 where the sets of composite line meet at turning sections 624. Further, each set of composite line 610 and 620 may have various capricious shapes (e.g., flat, rounded, etc.) along the profiles (i.e., widths) of the sets of the composite lines. The shapes of sets of composite lines 610 and 620 are shown as relatively flat in FIG. 6 across the widths of the sets of composite lines. The various capricious shapes may be received by application 145 via various user inputs to computing device 145.

Line 200, 400, and 600 rendered by application 145 may be rendered relatively quickly because lines 200, 400, and 600 rendered by rendering composite lines 210, 410, and 610, respectively. Lines, such as composite lines 210, 410, and 610, are basic shapes provided by browsers, standalone drawing applications, etc. where the composite lines are rendered relatively quickly. That is browsers, standalone drawings applications, and the like are typically optimized for rendering lines, such as composite line, relatively quickly. Therefore, generating a line from composite lines provides that the line may also be rendered relatively quickly.

Referring again to FIG. 1, application 145 includes a user interface module 800 for rendering line 200, 400, and 600 on user interface 146 according to one embodiment. Application 145 may further include a line generation module 805 for generating composite lines 210, 410, and 610 as described above. Line generation module 805 may include a width analysis module 810 that determines the width of lines 200, 400 and 600 in pixels based on a received line width 815, which may be a physical width, such as in inches, centimeters, etc. Width analysis module 810 may determine the number of composite lines 210, 410, and 610 used for lines 200, 400, and 600 so that the lines 200, 400, and 600 have width 815. Line generation module 805 may include a color gradient module 825 that receives the number of composite lines 410 and 610 and assigns colors to the number of composite lines 410 and 610. Line generation module 805 may also include an opacity gradient module 830 that receives the number of composite lines 210, 410, and 610 and assigns opacities to the number of composite lines 210, 410, and 610. Gradient module 830 may receive a hardness values for line 200, 400 and 600. and determine the opacity gradient to assign to the number of composite lines 210, 410 and 610 based on the hardness value. The number of composite lines 210, 410 and 610, the color gradient, and/or the opacity gradient may be supplied from line generation module 805 to user interface module 800 where user interface module 800 renders lines 200, 400 and 600 based on the composite lines.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments, along with examples of how aspects thereof may be implemented. The above examples and embodiments should not be deemed to be the only embodiments, and are presented to illustrate the flexibility and advantages of the teachings hereof. Based on the above disclosure and the following claims, other arrangements, embodiments, implementations, and equivalents may be employed without departing from the scope hereof, as defined by the claims.

I claim:

1. A method for drawing a calligraphic line having a width, the method comprising:
    receiving a path for rendering the calligraphic line in a user interface, wherein the path includes a first segment having a first width and a second segment having a second width;
    determining, by a computing device, a first number of composite lines to render for the first segment of the path to have the first width and a second number of composite lines to render for the second segment of the path to have the second width, wherein the first number of composite lines includes a first edge and a second edge, and the second number of composite lines includes a third edge and a fourth edge;
    receiving a selection of a first color and a second color for a color gradient for the calligraphic line;
    determining a first number of colors of the color gradient for the first segment of the path having a first width and a second number of colors of the color gradient for the second segment of the path having a second width;
    assigning each of the first number of colors of the color gradient to one or more of the first number of composite lines and each of second number of colors of the color gradient to one or more of the second number of composite lines, such that the first and third edges have the first color, and the second and fourth edges have the second color; and
    rendering, by the computing device, the first number of composite lines in parallel along the first segment of the path and the second number of composite lines in parallel along the second segment of the path to form the calligraphic line, wherein the first edge is connected to the fourth edge.

2. The method of claim 1, wherein assigning each of the first number of colors of the color gradient to one or more of the first number of composite lines further comprises setting the first number of colors of the color gradient equal to the first number of composite lines, wherein the color gradient transitions from the first color to the second color across the width of the calligraphic line.

3. The method of claim 2, wherein the composite lines have an increasing amount of the second color and a decreasing amount of the first color from the one of the composite line to the another of the composite lines.

4. The method of claim 2, wherein assigning each of the first number of colors of the color gradient to one or more of the first number of composite lines further comprises:
    setting the first number of colors of the color gradient equal to a portion of the first number of composite lines; and
    assigning the color gradient to the portion of the number of composite lines, wherein:
    the color gradient transitions from the first color to the second color across the portion of the number of composite lines, and
    another portion of the number of composite lines is different from the portion of the number of composite lines.

5. The method of claim 4, further comprising:
    receiving a selection of at least a first additional color for at least a second color gradient for the calligraphic line; and
    assigning the second color gradient to the another portion of the number of composite lines.

6. The method of claim 1, further comprising:
    receiving a selection of a plurality of colors for a plurality of color gradients for a plurality of portions of the calligraphic line; and
    assigning the plurality of color gradients to the portions of the calligraphic line.

7. The method of claim 1, wherein the first segment is not parallel to the second segment.

8. The method of claim 1, wherein the first segment is connected to an end of the second segment such that the first number of composite lines in parallel along the first segment of the path are offset from the second number of composite lines in parallel along the second segment of the path and the first number of composite lines are parallel to the second number of composite lines.

9. A method for drawing a calligraphic line having a turning section along a longitude of the calligraphic line, the method comprising:

receiving a path for rendering the calligraphic line in a user interface, wherein the path includes a first segment having a first width and a second segment having a second width;

rendering, by a computing device, a first plurality of composite lines in parallel along the path to form a first side of the first segment of the calligraphic line in the user interface; and rendering, by the computing device, a second plurality of composite lines in parallel along the path to form a second side of the first segment of the calligraphic line in the user interface, wherein:

the first side of the first segment of the calligraphic line and the second side of the first segment of the calligraphic line are joined at the turning section;

the first side of the first segment of the calligraphic line together with the second side of the first segment of the calligraphic line are equal to the first width of the first segment, and the first segment of the calligraphic line is connected to the second segment of the calligraphic line also composed of a first side and a second side; and when the first segment and the second segment connect, the second side of the first segment of the calligraphic line and the first side of the first segment of the calligraphic line coincide at portions of the calligraphic line on the user interface, and the second side of the first segment of the calligraphic line replaces the first side of the first segment of the calligraphic line at the portions.

10. The method of claim 9, further comprising receiving a shape selection for the turning section, wherein the first plurality of composite lines and the second plurality of composite lines meet at the longitude according to the shape of the turning section.

11. The method of claim 10, further comprising receiving a second shape selection for the first side of the calligraphic line and a third shape selection for the second side of the calligraphic line, wherein rendering the first plurality of composite lines includes rendering the first plurality of composite lines to have the second shape, and rendering the second plurality of composite lines includes rendering the second plurality of composite lines to have the third shape.

12. The method of claim 11, wherein the second shape is for a width of the first side of the calligraphic line, and the third shape is for a width of the second side of the calligraphic line.

13. The method of claim 10, wherein the turning section is rounded.

14. The method of claim 10, wherein the turning section is an angle.

15. The method of claim 9, wherein the first side of the calligraphic line is a first color and the second side of the calligraphic line is a second color.

16. The method of claim 9, further comprising:
subsequent to rendering the first plurality of composite lines and the second plurality of composite lines, receiving an input for changing a shape of the turning section; and
changing the turning section of the calligraphic line on the user interface based on the input.

17. The method of claim 9, wherein:
the composite lines of the first plurality of composite lines have different opacities,
the first side of the calligraphic line has a varying opacity that matches the different opacities of the first plurality of the composite lines,
the composite lines of the second plurality of composite lines have different opacities, and
the second side of the calligraphic line has a varying opacity that matches the different opacities of the second plurality of the composite lines.

18. A system for drawing a calligraphic line having a width, the system comprising:
a user interface having a display; and
at least one processor connected to the user interface, wherein the at least one processor is configured to:
receive a path for rendering the calligraphic line in the user interface, wherein the path includes a first segment having a first width and a second segment having a second width;
determine a first number of composite lines to render for the first segment of the path to have the first width and a second number of composite lines to render for the second segment of the path to have the second width, wherein the first number of composite lines includes a first edge and a second edge, and the second number of composite lines includes a third edge and a fourth edge;
receive, from the user interface, a selection of a first color and a second color for a color gradient for the calligraphic line;
determine a first number of colors of the color gradient for the first segment of the path having a first width and a second number of colors of the color gradient for the second segment of the path having a second width;
assign each of the first number of colors of the color gradient to one or more of the first number of composite lines and each of second number of colors of the color gradient to one or more of the second number of composite lines, such that the first and third edges have the first color, and the second and fourth edges have the second color; and
render, on the display, the first number of composite lines in parallel along the first segment of the path and the second number of composite lines in parallel along the second segment of the path to form the calligraphic line, wherein the first edge is connected to the fourth edge.

19. The system of claim 18, wherein:
the composite lines of the first plurality of composite lines have different opacities,
the first side of the calligraphic line has a varying opacity that matches the different opacities of the first plurality of the composite lines,
the composite lines of the second plurality of composite lines have different opacities, and
the second side of the calligraphic line has a varying opacity that matches the different opacities of the second plurality of the composite lines.

20. The system of claim 18, wherein the at least one processor is configured to assign each of the first number of colors of the color gradient to one or more of the first number of composite lines by:
setting the first number of colors of the color gradient equal to a portion of the first number of composite lines; and
assigning the color gradient to the portion of the number of composite lines, wherein:
the color gradient transitions from the first color to the second color across the portion of the number of composite lines, and
another portion of the number of composite lines is different from the portion of the number of composite lines.

21. The system of claim 20, wherein the at least one processor is further configured to:

receive, from the user interface, a selection of at least a first additional color for at least a second color gradient for the calligraphic line; and assign the second color gradient to the another portion of the number of composite lines.

22. A system for drawing a calligraphic line having a turning section along a longitude of the calligraphic line, the method comprising, the system comprising:

a user interface having a display; and at least one processor connected to the user interface, wherein the at least one processor is configured to:

receive a path for rendering the calligraphic line in the user interface, wherein the path includes a first segment having a first width and a second segment having a second width;

render, on the display, a first plurality of composite lines in parallel along the path to form a first side of the first segment of the calligraphic line in the user interface; and render, on the display, a second plurality of composite lines in parallel along the path to form a second side of the first segment of the calligraphic line in the user interface, wherein:

the first side of the first segment of the calligraphic line and the second side of the first segment of the calligraphic line are joined at the turning section;

the first side of the first segment of the calligraphic line together with the second side of the first segment of the calligraphic line are equal to the first width of the first segment, and the first segment of the calligraphic line is connected to the second segment of the calligraphic line also composed of a first side and a second side; and when the first segment and the second segment connect, the second side of the first segment of the calligraphic line and the first side of the first segment of the calligraphic line coincide at portions of the calligraphic line on the user interface, and the second side of the first segment of the calligraphic line replaces the first side of the first segment of the calligraphic line at the portions.

23. The system of claim 22, wherein the at least one processor is further configured to receive a shape selection for the turning section, wherein the first plurality of composite lines and the second plurality of composite lines meet at the longitude according to the shape of the turning section.

24. The system of claim 22, wherein the at least one processor is further configured to:

subsequent to rendering the first plurality of composite lines and the second plurality of composite lines, receive, from the user interface, an input for changing a shape of the turning section; and change the turning section of the calligraphic line on the user interface based on the input.

25. The system of claim 22, wherein:

the composite lines of the first plurality of composite lines have different opacities, the first side of the calligraphic line has a varying opacity that matches the different opacities of the first plurality of the composite lines, the composite lines of the second plurality of composite lines have different opacities, and the second side of the calligraphic line has a varying opacity that matches the different opacities of the second plurality of the composite lines.

* * * * *